United States Patent [19]

Stocchiero

[11] Patent Number: 4,998,874
[45] Date of Patent: Mar. 12, 1991

[54] MOULD WITH A SINGLE-BLOCK PLUNGER FOR THE MOULDING OF ELECTRIC ACCUMULATOR BOXES

[76] Inventor: Olimpio Stocchiero, 5 Via Kennedy, 36050 Montorso Vicentino (Vicenza), Italy

[21] Appl. No.: 307,252

[22] Filed: Feb. 7, 1989

[30] Foreign Application Priority Data

Feb. 16, 1988 [IT] Italy ................. 85520 A/88

[51] Int. Cl.⁵ ......................................... B29C 45/40
[52] U.S. Cl. ................................ 425/556; 249/66.1; 249/176; 425/438
[58] Field of Search ............... 425/556, 577, 588, 468, 425/554, 351, 422, 438; 249/176, 177, 184, 67, 66.1; 206/328, 333, 334

[56] References Cited

U.S. PATENT DOCUMENTS

| | | | |
|---|---|---|---|
| 3,473,197 | 10/1969 | Wilds et al. | 425/577 |
| 3,564,660 | 2/1971 | Darnell | 425/556 X |
| 3,572,424 | 3/1971 | Byrne | 425/556 X |
| 3,669,598 | 6/1972 | Tucker | 425/556 |
| 3,816,047 | 6/1974 | Mohler | 425/577 |
| 3,838,960 | 10/1974 | Lovejoy | 425/556 X |
| 3,930,780 | 1/1976 | Lovejoy | 425/556 |
| 4,481,161 | 11/1984 | Grannen | 425/468 X |
| 4,576,568 | 3/1986 | Grannen | 425/588 X |
| 4,676,731 | 6/1987 | Grannen | 249/176 X |
| 4,732,558 | 3/1988 | Grannen | 425/577 X |

Primary Examiner—Richard L. Chiesa

[57] ABSTRACT

A single-block central plunger is manufactured, which is particularly suited for the production of boxes made of plastic material for electric accumulators. The mould includes a mobile plate (3) supporting some lateral cores (5) and a fixed plate (2) supporting a fixed central plunger (7), wherein the mobile plate (3) moves co-axially in relation to the fixed plate (2) by sliding on some guiding columns (4). The fixed central plunger (7) supported by the fixed plate (2) is made from a single block and its cores (8) are obtained from the same block, as well as its box angle-plate (11), preferably by machining them with wire cutting spark erosion tool machines.

6 Claims, 2 Drawing Sheets

MOULD WITH A SINGLE-BLOCK PLUNGER FOR THE MOULDING OF ELECTRIC ACCUMULATOR BOXES

The invention concerns a mould with a single-block plunger for the moulding of boxes for electric accumulators.

The boxes for electric accumulators, especially those for lead accumulators are containers preferably made of plastic material, the inner part of which is partitioned into equal cells which are parallel with each other and are suited to hold the plates and the electrolyte.

Nowadays one of the most economical and most widely used methods for the production of boxes for electric accumulators is the injection moulding process. This process consists of injecting within a mould a thermoplastic material which has been turned into a soft paste through heating. The mould consists of several parts, which are solidly connected with each other and which, being joined, define the geometrical configuration of the box to be manufactured.

The known technique for the manufacture of the injection moulds for the production of accumulator boxes realizes a fixed plate counterposed to a mobile plate on which removable lateral cores defining the outer geometry of the box to be manufactured are assembled. On the other hand, the geometry of the inner cells of the box is obtained by means of a central plunger consisting of a plurality of cores, each defining one of the cells which will constitute the box after the moulding process.

In the known moulds, the central plunger is obtained by joining together a plurality of cores facing each other, which are firmly bound together by the action of a constricting iron ring which surrounds them.

The moulds of the known type which have just been described present some inconveniences.

The main inconvenience arises from the fact that, since the central plunger consists of a plurality of cores, it has limited rigidity, so that while the plastic material is being injected, the cores constituting the plunger have a tendency to bend. Consequentially, the thickness of the walls of the cells constituting the box is not homogeneous. This inconvenience becomes particularly relevant when the boxes are rather deep, because of the considerable length of the cores.

Another inconvenience arises from the fact that the iron ring constricting the central plunger must be very sturdily built, due to the considerable strength which it must exert to keep the cores tightly bound together. For this reason, it must present large dimensions, thereby considerably increasing the overall dimensions and weight of the mould.

Moreover, the contact between the constricting iron ring and the cores constituting the central plunger occurs along a slanted ring-shaped surface and, in order for this contact to evenly transmit the binding force, it must be extremely precise. This entails, therefore, the other inconvenience of a high manufacturing cost, because of the difficulty of grinding slanted surfaces, particularly in the corner positions.

Notwithstanding the above-mentioned inconveniences, the experts in this field have always deemed it technically and factually impossible to obtain a single-block mould for the moulding of the above-mentioned accumulator boxes.

The purpose of the present invention is to eliminate the above-described inconveniences.

SUMMARY OF THE INVENTION

The main purpose of the invention is to provide a mould, particularly suited for the injection moulding of boxes for electric accumulators, wherein the cores constituting the central plunger present, while the mould is being used, extremely reduced or almost negligible flexions, so as to guarantee the homogeneity of the thickness of the cell walls of the boxes, particularly in relation to the partition walls dividing one cell from another and in their upper section, particularly near the junction between the box and its lid. Another purpose of the invention is to obtain a mould, which, given the same dimensions of the box to be manufactured, presents, in comparison with the moulds of the known type, considerably smaller overall dimensions and weight. The last but not the least purpose of the invention is that of obtaining a mould for electric accumulator boxes which is easy and less costly to manufacture, particularly where the manufacturing of the constricting iron ring and of the central plunger is concerned.

The above-mentioned purposes and others which will be better described hereafter are fulfilled by a mould for the manufacture of boxes for electric accumulators which, in accordance with the patent claims, comprises a mobile plate suited to receive removable lateral cores and connected through cylindrical columns, along which it slides, with a fixed plate supporting a central fixed plunger, characterized in that the central fixed plunger consists of a single block, suitable means being foreseen for fastening the plunger on the fixed plate and for the automatic removal of the boxes after the moulding.

The main advantages of the invention consist of an improvement of the product quality, while the manufacturing cost of the mould becomes considerably lower than the manufacturing costs of the moulds of the known types. The manufactured product obtained with this mould presents partition walls of a uniform thickness, both when the mould is new and after a high number of mouldings, due to the inherent structures of the mould plunger.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The mentioned purposes and advantages are better explained hereafter in the description of a preferred form of execution of the invention, which is given by way of example only, but is not meant to limit its scope and which is represented in the drawing, wherein.

DESCRIPTION OF THE PREFERRED EMBODIMENT

Figure 1:
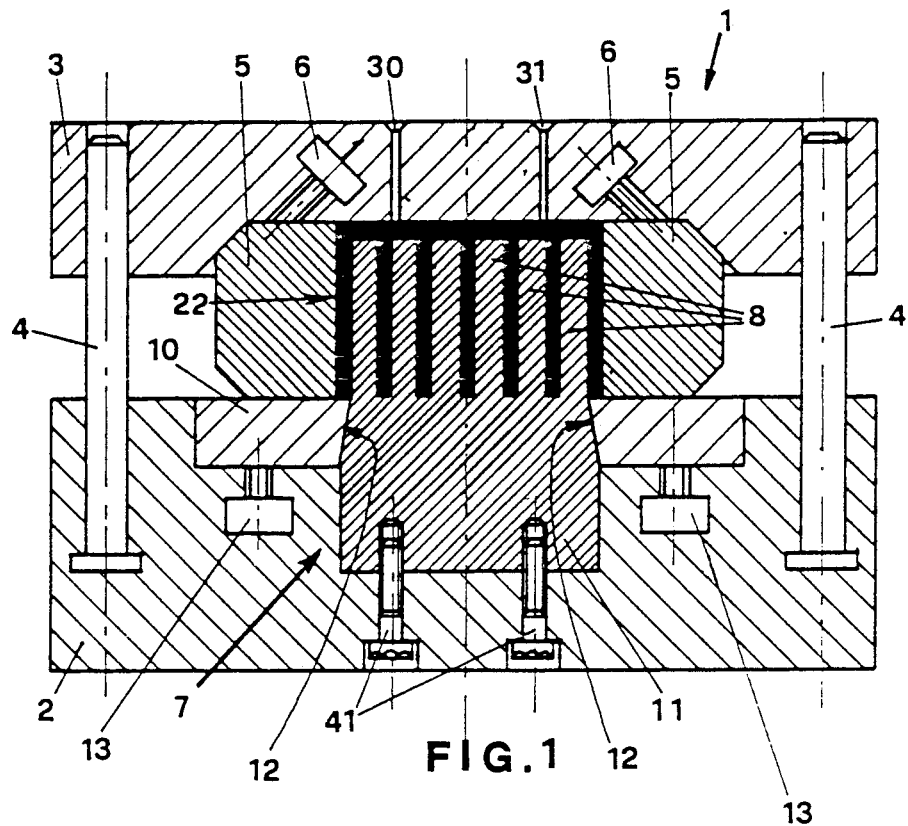
FIG. 1 shows the mould according to the invention in its closed position.

With reference to the mentioned figures, it can be observed in FIG. 1 that the mould according to the invention, which is indicated as a whole by numeral 1, consists of a fixed plate 2 and of a mobile plate 3, the latter being opposite to the former, in relation to which it moves co-axially and is guided by the cylindrical columns 4, which are rigidly connected with the mobile plate 2.

The two plates 2 and 3 are called mobile plate, and fixed plate respectively, because plate 2 is rigidly connected with the fixed structure of the injection machine (not represented in the drawing), while plate 3 is rigidly connected with the mobile part of the injection machine which is set in motion by a pneumatic system opening and closing the mould (also not represented in the drawing).

In FIG. 1, it can also be observed that the lateral cores 5 are lodged on the mobile plate 3 and that they limit the outer surface of the box to be moulded, when the die is closed. There are generally four lateral cores arranged so as to shape the four outer sides of the box and each of them is provided with a hydraulic jack 6 which causes them to move in an oblique direction in relation to the axis of the mould. On the other hand, as can be observed in FIG. 3, the fixed plate 2, presents in its central part an impression 9, suited to receive the box angle-plate 11 constituting the attachment stand of the central plunger 7. As can be observed in FIG. 4, the central plunger 7 presents in its upper section 20 a plurality of cores 8, suited to create the cells of box 22 during the moulding process. Moreover, the box angle-plate 11 and the upper section 20 of the central plunger 7 are connected with each other through a peripheral surface 12 with a slanted profile.

The fixed plate 2 also houses a stripper 10 consisting of a plate with a hole in the middle, whose inner surface matches the peripheral surface 12 with a slanted profile which is positioned on the central plunger 7. Stripper 10 is, moreover, co-axially mobile in relation to the central plunger 7 because of the hydraulic jacks 13 which are lodged within the fixed plate 2. In the just described inventive solution, the hydraulic jacks 6 and 13 are used respectively for the driving of the lateral cores 5 and of stripper 10. This is, in any case, only one of several possible driving systems and it is given by way of example only, since both the driving of the cores 5 and of stripper 10 may also be obtained by means of fixed strikers or of a springs-and-slides system.

Figure 4:
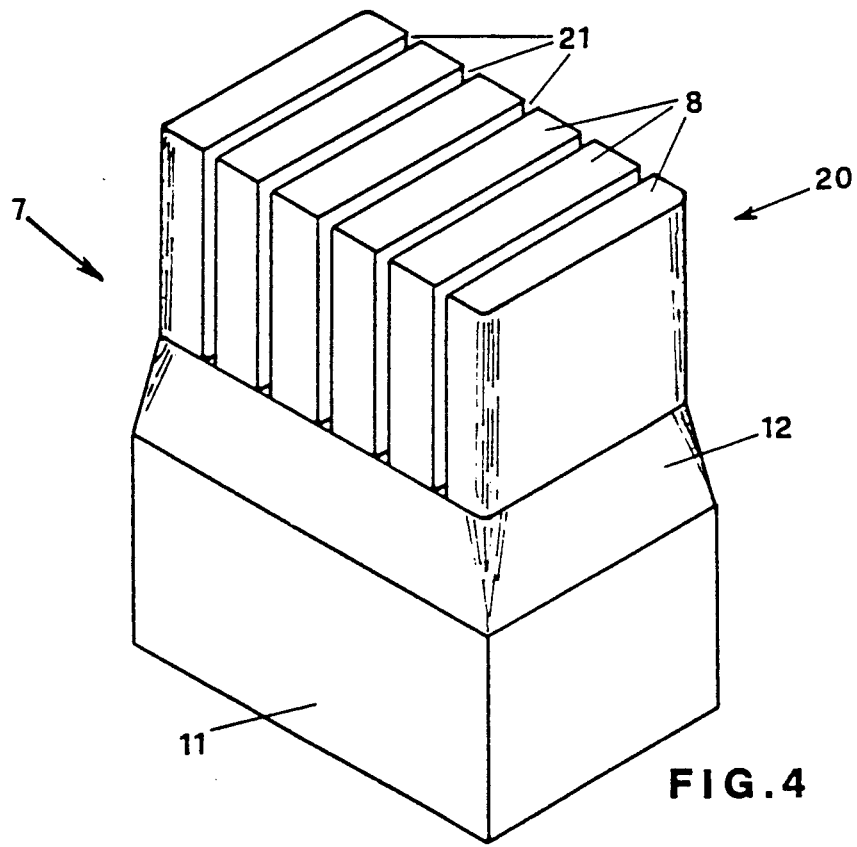
FIG. 4 shows in a perspective view the detail of the fixed central plunger.

As far as the central plunger 7 is specifically concerned, it can be observed in FIG. 4, that it is obtained from a single steel block, which is machined so as to present a box angle-plate 11 for its coupling with the fixed plate 2 and an upper section 20 consisting of a plurality of cores 8, preferably obtained by working on the original block with wire-cutting spark erosion process. Moreover, as has already been said, the upper section 20 and the box angle-plate 11 are joined together by a peripheral slanted band 12, which acts as a supporting surface for stripper 10.

The mould works as follows.

It is mounted in its closed position on the injection machine, as it is shown in FIG. 1 and its plates 2 and 3 are secured on the fixed part and on the mobile part of the injection machine respectively.

The hydraulic system of the injection machine generates a force which keeps the fixed plate 2 and the mobile plate 3 pressed against each other with a strength, the value of which must be such as to prevent the plates 2 and 3 from separating while the plastic material is being injected.

At this point the injection operation can begin. It consists of forcing the plastic material, which has been heated to a paste, through the injection channels 30 and 31.

The injection process continues until the mould has been completely filled, so as to form the desired box 22.

Figure 2:
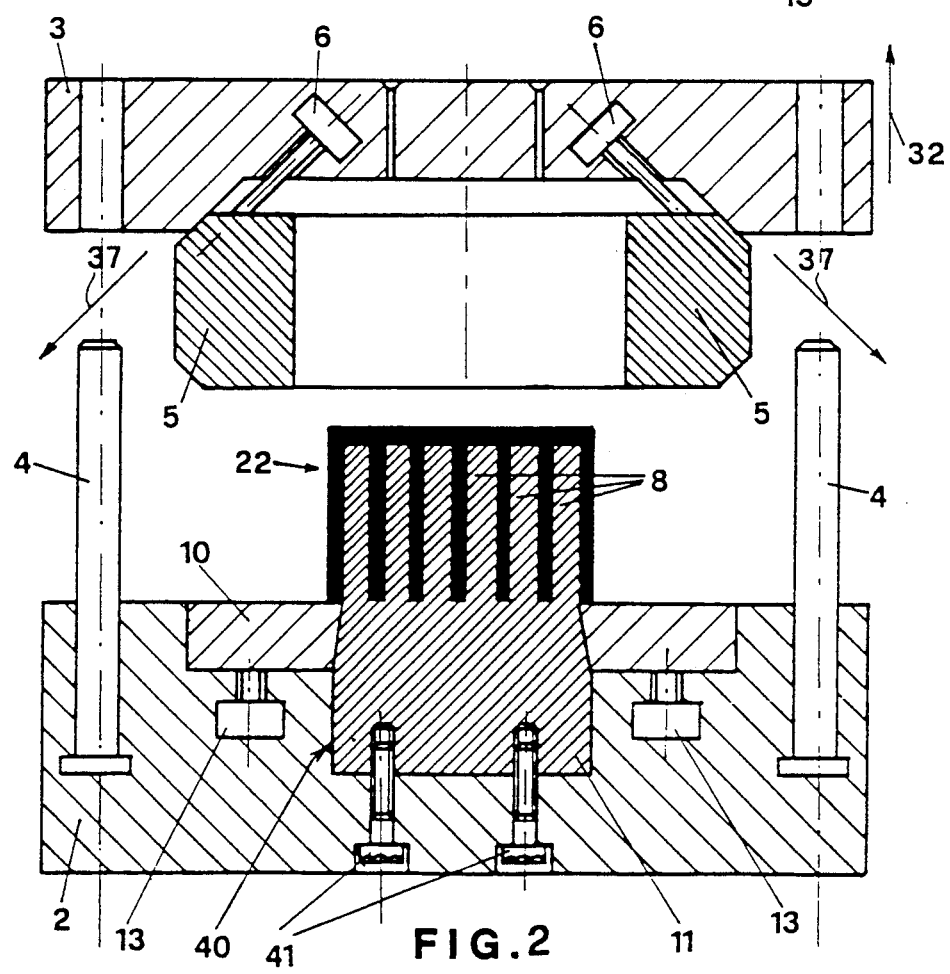
FIG. 2 shows the mould according to the invention in its open position.

After the injection has been completed and the time necessary for the plastic material to solidify has elapsed, the mobile plate 3, as can be observed in FIG. 2, is driven in the direction indicated by arrow 32, and, at the same time, the lateral cores 5 are driven in the oblique direction 37 by the hydraulic jacks 6. The exterior of box 22 is thereby released, but its interior is still held in place by the impressions 21 of the cores 8 of the central plunger 7.

Figure 3:
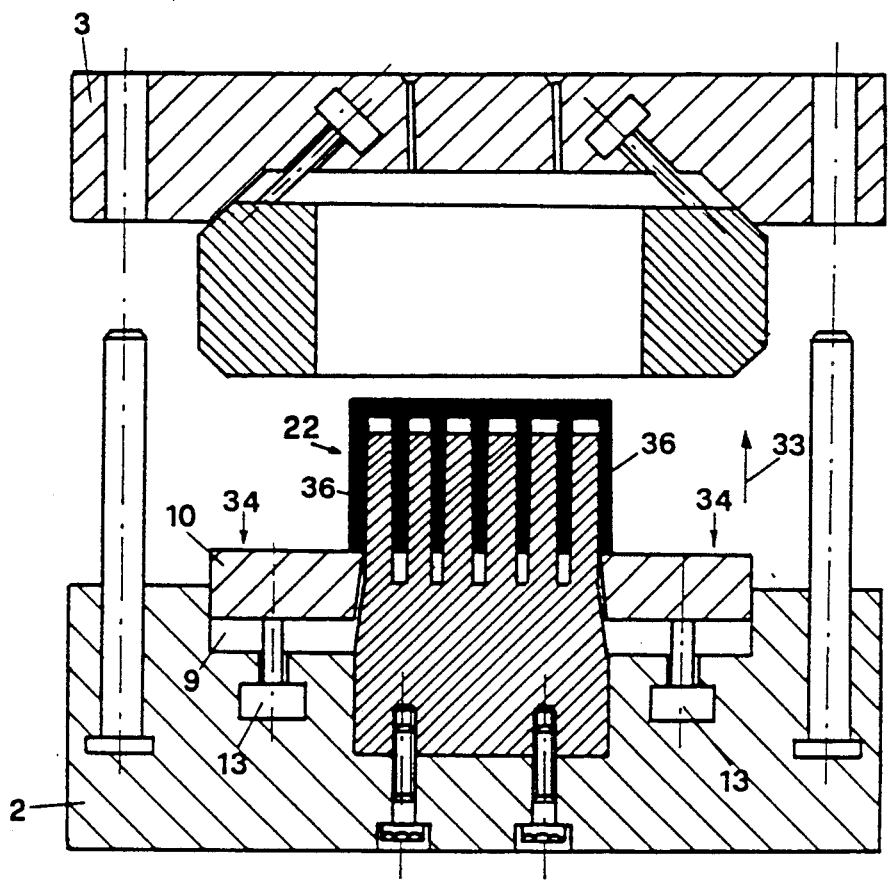
FIG. 3 shows the mould according to the invention with the stripper in the action of expelling the moulded box.

The removal phase of the moulded box 22 consists, as can be observed in FIG. 3, in the displacement, which occurs co-axially in relation to the mould, of stripper 10 which is driven by the action of the hydraulic jacks 13, which are connected with it. It will be observed that surface 34 of stripper 10 interferes with the top 35 of the peripheral edges 36 of box 22, which is, however, lifted so as to clear the cores 8 of the central plunger 7. It will be pointed out that the FIGS. 2 and 3 only represent the movements and the positions of the mould components in relation to each other, while the given distances have no reference to the actual distances in the machine, these being considerably greater in order to allow the removal of the moulded boxes 22.

Based on what has been said, it can be remarked that the cores 8 constituting the central plunger 7 have considerable rigidity, since they are an integral part of the box angle-plate 11. It is obvious that a high rigidity of the cores 8 entails their decreased deformation and, as a consequence, a decreased deformation of the walls of box 22. More specifically, it will be noticed that the cores 8 are completely rigid near the junction surface 12, since the construction consists of a single block and, therefore, the moulded box has an absolute dimensional constancy. Thus, the thickness of all the vertical walls moulded in the box is also constant in the area of the upper edge and of the edge connecting the box with its lid. This construction of the mould insures a long range dimensional constancy, since the possible wear-and-tear of the plunger can not involve the junction base of the cores 8 to the peripheral surface 12.

No additional means for the securing and the stiffening of the central plunger 7 are necessary since, as has been said, it already has a sufficient inherent rigidity arising from the fact that it is manufactured from a single steel block.

It is therefore sufficient that along the peripheral surface 12 constituting the contact surface between stripper 10 and the central plunger 7, the tightness is such as to prevent the seepage of the plastic material during the moulding process, since no action or strength is necessary on the part of stripper 10 to restrain the central plunger 7. As a consequence, stripper 10 may present a noticeably reduced thickness, thereby contributing to the reduction of the weight and overall dimensions of the mould, given the same overall dimensions of box 22 to be moulded, in comparison with the moulds of the known type, wherein the plunger consists of bound-together cores.

Moreover, the fact that stripper 10 matches the central plunger 7 along surface 12 without any need for a restraining force, it is possible to machine the matching surfaces with a lower degree of precision, which therefore, entails a decrease in the manufacturing time and costs of the mould.

On the basis of what has been described, it can be understood that the mould according to the invention achieves all the proposed purposes and also obtains all the ensuing advantages. In the description of the mould, some accessories which are indispensable for the performance of the mould, but which do not characterize the idea of the present invention have purposefully not been described or represented in the drawing, since they belong to already known techniques and are in any case common in the injecting moulds for plastic materials.

The mould according to the invention can also be made in different forms of execution, based however on the same inventive idea and during its manufacture modifications can be performed, which will not exceed the scope of the patent protection of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A mould for manufacturing plastic boxes for electric accumulators comprising:
    a mobile plate;
    a plurality of lateral cores positioned in said mobile plate;
    a fixed plate;
    gliding columns connecting said mobile plate and fixed plate, said mobile plate being movable along said gliding columns;
    a central plunger positioned in said fixed plate, said central plunger being a one-piece unitary element formed from a single block, the central plunger comprises a single-block box angle-plate and an upper section having a plurality of prismatic cores and wherein the box angle-plate and upper section are joined at a junction having a peripheral slanted surface; and
    means for securing said central plunger on said fixed plate and for stripping the boxes from the central plunger after moulding thereof.

2. The mould as recited in claim 1, wherein the central plunger is positioned within a seat defined in the fixed plate and secured therein by bolts passing through the bottom of the fixed plate.

3. The mould as recited in claim 2, wherein the means for securing and stripping comprises a stripper, the stripper being a bored prismatic plate operatively coupled to the central plunger through the peripheral slanted surface, said stripper being located in a stripper seat defined in the fixed plate.

4. The mould as recited in claim 1, further comprising:
    means for laterally moving each of said plurality of cores relative to the mobile plate;
    means for moving the central plunger relative to the fixed plate;
    said means for securing and stripping comprising a movable stripper mounted on said fixed plate; and
    means for moving said stripper relative to the fixed plate and relative to the central plunger.

5. The mould as recited in claim 4, wherein the central plunger is positioned within the stripper and wherein the stripper is movable into contact with the central plunger, said stripper and said central plunger having mating, canted surfaces at contact portions thereof.

6. The mould as recited in claim 1, wherein the means for securing and stripping comprises a stripper, said central plunger being positioned within the stripper and the central plunger and stripper having a continuing, mating surface therebetween.

* * * * *